United States Patent
Deruyck et al.

(12) 
(10) Patent No.: US 6,329,073 B1
(45) Date of Patent: Dec. 11, 2001

(54) ELONGATED STEEL OBJECT TREATED WITH A CORROSION INHIBITING COMPOSITION

(75) Inventors: Frank Deruyck, Nazareth; Johan Van Brabant, Zwevegem, both of (BE)

(73) Assignee: N.V. Bekaert S.A., Zwevegem (BE)

( * ) Notice: Subject to any disclaimer, the term of this patent is extended or adjusted under 35 U.S.C. 154(b) by 0 days.

(21) Appl. No.: 09/284,347
(22) PCT Filed: Feb. 13, 1997
(86) PCT No.: PCT/EP97/00690
  § 371 Date: Jul. 20, 1999
  § 102(e) Date: Jul. 20, 1999
(87) PCT Pub. No.: WO98/16668
  PCT Pub. Date: Apr. 23, 1998

(30) Foreign Application Priority Data

Oct. 15, 1996 (EP) .................................................. 96202870

(51) Int. Cl.[7] .......................... B32B 15/18; B32B 15/04; B32B 5/18; B32B 3/10
(52) U.S. Cl. ...................... 428/621; 428/304.4; 428/195; 428/334; 428/375; 428/457; 428/364; 428/389; 106/14.05
(58) Field of Search ....................................... 428/676, 681, 428/621, 32, 195, 344, 364, 375, 378, 379, 389, 457, 467, 472, 458, 465, 469, 484, 141, 156, 304.4, 343, 334; 148/595, 596, 598, 600; 427/207.1, 407.1, 417, 418, 416; 106/14.05, 14.22, 14.23, 14.25, 14.26, 14.29, 14.34–14.36, 14.45; 252/33, 38–40; 72/286; 152/527

(56) References Cited

U.S. PATENT DOCUMENTS 3,526,596  9/1970  Kress et al. .................... 252/49.5
3,691,440  9/1972  Haddock .............................. 318/313

(List continued on next page.)

FOREIGN PATENT DOCUMENTS 27 04 190   8/1978  (DE) .
0 295 108  12/1988  (EP) .

(List continued on next page.)

OTHER PUBLICATIONS

Database WPI Section Ch, Week 9208, Derwent Publications Ltd., London, GB, AN 92–062613 XP002033414 & RO 100 667 (Comb Petrochim Tele), Jan. 30, 1991.

(List continued on next page.)

*Primary Examiner*—Blaine Copenheaver
*Assistant Examiner*—Michael LaVilla
(74) *Attorney, Agent, or Firm*—Foley & Lardner

(57) ABSTRACT

An elongated steel object is covered with a coating layer having 1) an electrode potential exceeding the electrode potential of steel, or 2) a rate of corrosion which is lower than the rate of corrosion of steel and is treated with a corrosion inhibiting composition. This composition includes: A) a carrier of an oily or waxy type; B) active components comprising at least B1) a corrosion-inhibitor in the form of a sulphonate of the group IIA, B2) a co-corrosion-inhibitor, selected from the group consisting of (a) fatty acids, having 6–24 carbon atoms, aromatic acids and naphthenic acids, which acids have the free acid form or the salt form; (b) imidazoline derivatives having a $C_{6-24}$ alkyl moiety; and (c) $C_{6-24}$ alkylsuccinic anhydride compounds; as well as mixtures of compounds defined under (a), (b) and (c); and (C) optionally a compound selected from the group consisting of: C1) a water repellent; C2) a synthetic ester derived from a $C_{1-10}$ alcohol with 1–12 hydroxyl groups and $C_{6-24}$ fatty acids; and C3) a $C_{6-18}$ alcohol as well as a mixture of compounds defined under C1), C2) and/or C3).

30 Claims, 1 Drawing Sheet

U.S. PATENT DOCUMENTS

| | | | |
|---|---|---|---|
| 4,137,359 | * | 1/1979 | Bak et al. .............................. 428/295 |
| 4,178,261 | | 12/1979 | Dhein et al. ........................... 252/57 |
| 4,201,681 | | 5/1980 | Lipinski et al. ..................... 252/33.2 |
| 4,330,592 | * | 5/1982 | Tsukamoto et al. ................. 428/378 |
| 4,343,660 | | 8/1982 | Martin ................................. 148/6.14 |
| 4,404,828 | * | 9/1983 | Blachford ................................ 72/42 |
| 4,871,476 | | 10/1989 | Yoshimura et al. ................. 252/565 |
| 4,898,687 | | 2/1990 | Parker et al. ................... 252/389.61 |
| 4,978,468 | | 12/1990 | Yoshimura et al. .................... 252/79 |
| 5,023,016 | * | 6/1991 | Gallacher et al. ............. 252/389.52 |
| 5,221,490 | | 6/1993 | Tajiri et al. ............................ 252/33 |
| 5,956,935 | * | 9/1999 | Katayama et al. ..................... 57/902 |
| 6,068,918 | * | 5/2000 | Van Der Veer et al. ............ 428/379 |

FOREIGN PATENT DOCUMENTS

| | | |
|---|---|---|
| 0 331 279 | 9/1989 | (EP) . |
| 2 633 947 | 1/1990 | (FR) . |
| 2 157 310 | 10/1985 | (GB) . |
| 2-227304 | 9/1990 | (JP) . |

OTHER PUBLICATIONS

Patent Abstracts of Japan, vol. 018 No. 201 (C–1188), Apr. 8, 1994 & JP 06 002168 (Parker Kosan KK), Jan. 11, 1994.

Database WPI Section Ch, Week 7837, Derwent Publications Ltd., London, GB; AN 78–66072A XP002033412 & JP 53 090 454 A (Kanai H), Aug. 9, 1978.

Database WPI Section Ch, Week 8951, Derwent Publications Ltd., London, GB; AN 89–376133 XP002033413 & RO 97 139 A (Intr Dero Deterg), Jun. 30, 1989.

* cited by examiner

ELONGATED STEEL OBJECT TREATED WITH A CORROSION INHIBITING COMPOSITION

RELATED APPLICATION

In co-pending European application 96 202 870.0, the priority of which has been invoked, a comparative example 1 on page 16 of the description made mention of a corrosion inhibitor "which was not of the azole type". The related corrosion inhibiting composition did result in a considerable loss in adhesion. Between brackets, however, it has been added that The inventors have discovered, however, that with other types of rubber a considerable reduction in adherence loss can be obtained.

In the present application, the inventors disclose their further results in this respect.

FIELD OF THE INVENTION

The invention relates to elongated objects of steel, in particular steel cords, treated with a corrosion inhibiting composition. Another aspect of the invention is a process for treating elongated objects of steel with the corrosion inhibiting composition.

BACKGROUND OF THE INVENTION

Corrosion inhibiting compositions, typically in the form of solutions, suspensions or emulsions are commonly employed in the metal working industry to provide improved corrosion resistance of the metal objects involved. An example of such metal objects is steel cord, which is applied in rubber articles as metal reinforcement. Corrosion of steel cord may occur in the manufacturing process, during storage and transport of the steel cord as well as during and after the application of the steel cord in the rubber articles. In this respect it is remarked that always a certain amount of moisture is present in said rubber articles whereas additional moisture may penetrate the rubber articles by way of diffusion and in particular by way of hair cracks and other imperfections.

In the prior art many corrosion inhibiting compositions have been used. For instance, in DE-A 2.704.190 a method is disclosed for improving the corrosion resistance of steel cord coated with Zn, brass or bronze layer by dipping it just long enough in a sodium nitrite or potassium nitrite solution for moistening to occur and then drying it at a temperature below 150° C.

Another method for providing corrosion protection to steel cord to be embedded in rubber articles like tires is disclosed in JP 02227304 A2. According to said document the tires have interior layers containing water-absorbing polymers and exterior layers of halobutyl rubbers.

Further it is known to apply a corrosion inhibiting composition, comprising specific reaction products like the product 6[2,4-bis(allylamino)-s-triazin-6-ylamino]-2-mercaptobenzothiazole as disclosed in Example 10 (B) of EP 331279 A2 to brass coated steel cord.

As apparent from the above it is known from the prior art to apply corrosion inhibiting compositions to steel cord resulting in an improved corrosion resistance of the treated steel cord. However, such an improvement of the corrosion resistance may result in a considerable loss of the adherence between the steel cord and the rubber comprising the steel cord as a reinforcing means.

U.S. Pat. No. 5,221,490 discloses a rust-preventive lubricant composition useful for zinc-plated steel materials in the form a sheet or strip. The composition of the invention comprises a lubricant component and a rust-inhibiting component with a composition comprising at least one member selected from sulphonates ($C \geq 16$), carboxylic acids ($C \geq 12$), and salts of carboxylic acids.

U.S. Pat. No. 4,201,681 discloses a metalworking lubricant composition which is both effective as corrosion inhibitor and as drawing lubricant and which comprises a mineral oil and a barium sulphonate.

GB-A-2 157 310 discloses a lubricating and anti-corrosion composition for treating metal such as steel sheets. The composition comprises a mineral oil, a basic calcium salt of an alkylaryl sulphonic acid, a further anti-corrosion agent and a saturated $C_{12-18}$ fatty acid.

JP-A-53-090 454 discloses a steel cord for reinforcement of rubber products coated with brass and with a solution prepared by dissolving a percentage of barium dinonyl naphtalene sulphonate in mineral oil.

In view of the above the invention is directed to a method for avoiding the above disadvantage, i.e. to develop a corrosion inhibiting composition which decreases the level of corrosion of the steel cord and hardly affects the adherence between the reinforcing means made of steel like a tire cord and some types of rubber. Further the invention should particularly relate to compositions which are environmentally acceptable.

SUMMARY OF THE INVENTION

According to a first aspect of the present invention, there is provided an elongated object of a steel partly or fully in the form of a hard drawn steel wire of in the form of a steel cord with such steel wires. The steel object is covered with a coating layer having an electrode potential exceeding the electrode potential of steel or having a rate of corrosion which is lower than the rate of corrosion of steel. The elongated steel object is treated with a corrosion inhibiting and adhesion retention composition, which comprises A) an oily or waxy carrier:
B) active components comprising
  B1) a corrosion-inhibitor in the form of a sulphonate of the group IIA,
  B2) a co-corrosion-inhibitor, selected from the group consisting of
    (a) fatty acids having 6–24 carbon atoms, aromatic acids and naphthenic acids, which acids have the free acid form or the salt form;
    (b) imidazoline derivatives having an $C_{6-24}$ alkyl moiety; and
    (c) $C_{6-24}$ alkylsuccinic anhydride compounds;
  as well as a mixture of the compounds defined under (a), (b) and or (c) or mixtures of multiple forms of the compounds defined under (a), (b) and (c); and
C) optionally a compound selected from the group consisting of
  C1) a water repellent;
  C2) a synthetic system derived from a $C_{1-10}$ alcohol with 1–12 hydroxyl groups and $C_{6-24}$ fatty acids; and
  C3) a $C_{6-18}$ alcohol
as well as a mixture of compounds defined under C1, C2 and C3 or mixtures of multiple forms of the compounds defined under C1, C2, and C3.

The elongated steel objects may have been covered by a metal or plastic coating which, however, do not coat the steel object completely. A particular metal coating is brass.

The benefits of using the above corrosion inhibiting compositions may be summarized as follows:

(a) the compositions impart steel cord, treated with these compositions, with adequate resistance against corrosion, (b) the compositions maintain adhesion of some types of rubber to steel cord, treated with these compositions, after embedding said steel cord in rubber and subsequent vulcanizing, to an acceptable level. The compositions do hardly interfere with the delicate physicochemical processes which anchors steel cord to rubber during vulcanization; and (c) after vulcanization of the rubber in which steel cord is embedded, the compositions according to the invention continue to impart to steel cord some degree of corrosion resistance.

According to a second aspect of the present invention, there is provided a process for manufacturing a corrosion resistant elongated steel object comprising the following steps:

(a) covering a steel wire with a coating layer having an electrode potential exceeding the electrode potential of steel or having a rate of corrosion, which is less than the rate of corrosion of steel;

(b) drawing the steel wire object up to the final diameter; and (c) at least partly covering the steel wire with a corrosion inhibiting composition as mentioned above.

DETAILED DESCRIPTION OF THE INVENTION

A. The Compositions

The components of the composition according to the invention can be elucidated by the following detailed description.

Carrier

The corrosion inhibiting compositions or corrosion preventives according to the invention typically contain one or more carriers. They are to be considered as the carriers of the active additives and more specifically the corrosion inhibitors. To a certain extent the carrier itself may have corrosion preventing properties, especially due to its hydrophobic character. Carriers may be of mineral, animal, vegetable or synthetic origin. By mixing non-polar with more polar compounds the solubility characteristics can be adjusted to allow the additives to be solubilized.

Carriers of mineral origin include mineral oils and waxes. Examples of mineral carriers useful in the invention include naphthenic and paraffinic oils and waxes. Mineral oils and waxes are commercially available from Exxon, Shell and Sun oil companies.

Carriers of animal origin include natural fats and oils such as lard oil, sperm oil and tallow. Renderings from meat and fish production are primary sources of such animal based lubricants.

Carriers of vegetable origin include cottonseed oil, corn oil, castor oil, rapeseed oil and tal oil. These oils may be produced directly, or may result as a byproduct of other processes such as the pulping of wood.

Carriers of synthetic origin include esters such as polyol esters. Typical synthetic esters which may serve as co-carriers of the present invention are inter alia described in U.S. Pat. No. 3,526,596, and comprise the esters of fatty acids where the alcohol has 1 to 12 hydroxyl groups and the fatty acid has 6 to 24 carbon atoms. Other representative synthetic ester carriers are described in U.S. Pat. No. 3,691, 440 (the esters of organic monocarboxylic acids and dineoalkyl ethers with a tetrahydroxy functionality), U.S. Pat. No. 4,178,261 (esters incorporating 6-cyclohexylhexanoic acid and a polyhydric alcohol), U.S. Pat. No. 4,871,476 (esters of cyclohexanol or cyclohexanecarboxylic acid in combination with 1% to 70% by weight of a branched poly-α-olefin), U.S. Pat. No. 4,786,427 (diesters formed from dicarboxylic acids and monohydric compounds), U.S. Pat. No. 4,978,468 (cyclohexyl esters in combination with from 0.1 to 95% by weight of a polymer selected from hydrocarbonic polymers and polyesters).

Other synthetic carriers useful for the present invention include polyolefin oils (synthetic hydrocarbon oils), polyether oils including polyoxyalkylene glycols, polyalkylene oxide-ester oils, hydrocarbon polymers, and mono- or polyhydric alcohols having at least 5 carbon atoms.

Corrosion Inhibitors

The corrosion inhibitor is selected from the sulphonates of the group IIA, preferably from calcium sulphonates and most preferably from barium sulphonates.

Co-corrosion Inhibitors

A class of compounds incorporated into the composition according to the invention, and serving to enhance the corrosion preventing properties of the composition and organic acids, like fatty acids, aromatic acids and naphthenic acids and salts thereof. Fatty acids include natural or synthetic fatty acids having from 6 to about 24 carbon atoms. Representative fatty acids include, without limitation, lauric, lauroleic, myristic, myristoleic, arachidic, eicosapolyenoic, pentadecanoic, palmitic, palmitoleic, margaric, stearic, oleic, linoleic, eicosenoic, behenic, dihydroxyl stearic, licanic, docosenoic, docosapolyenoic, tallow fatty acids and tall oil fatty acids.

Representative counterions in the soaps of the fatty acids are Li, Na, K, Ca, Mg, Ba and Sr. Also amines, like TEA, MEA, DEA, AMP, etc., may be used to neutralize the organics for soap formation.

Aromatic acids include benzoic acid compounds substituted by one or more hydrophobic groups like $C_{6-24}$ alkyl groups. Further the aromatic acids may also have the salt form like alkaline, alkaline-earth, ammonium and amine salts.

Naphthenic acids are marketed products having the CAS Registry Number 64754-89-8 and 1338-24-5. More in particular naphthenic acids represent a complex combination of compounds. Said acids contain carboxylic acid functional groups and five- to six-member naphthenic rings in their molecular structure. Preferably the naphthenic acid is a naphthenic-13 acid used in the salt form like alkaline, alkaline-earth and ammonium salt, most preferably in the barium salt form.

Another class of compounds which also may be incorporated into the composition according to the invention, and which serve to enhance the corrosion preventing properties of the composition are imidazolines, having a $C_{6-24}$ alkyl moiety. For instance imidazoline phosphate esters having a $C_{6-24}$ alkyl group may be used.

Still another class of compounds which may be incorporated into the composition of the invention, and which serve to enhance the corrosion preventing properties of the composition are $C_{6-24}$ alkylsuccinic anhydrides, like undecyl, dodecyl and tridecyl succinic anhydride or mixtures thereof.

Water Repellents

Water repellents can be part of the composition to support the action of the corrosion inhibitors by preventing the presence of water at the steel/rubber interface. Suitable water repellents are $C_{1-5}$ alcohols and $C_{1-5}$ alkylglycols, preferably and butyldiethylene-glycol (+2-(butoxy-ethoxy) ethanol), having the CAS-number 112-34-5.

Synthetic Esters

Synthetic esters are applied for providing a good corrosion inhibition rating but more in particular for decreasing the adherence loss rating to a minimum. Said synthetic esters are derived from $C_{1-10}$ alcohols with 1–12 hydroxyl groups and $C_{6-24}$ fatty acids. Examples of such esters are the esters of neopentylglycol and $C_{8-18}$ technical fatty acids and the esters of neopentylglycol and cocos fatty acids.

$C_{6-18}$ Alcohols $C_{6-18}$ alcohols are also applied for providing a good corrosion inhibition rating and a minimal adherence loss rating. Preferably technical alcohol mixtures like $C_{12-13}$ technical alcohol are used.

The composition according to the invention may contain further additives. Examples thereof are mentioned above.

Stabilizers

Stabilizers might be needed to impart sufficient storage stability of the composition according to the invention. Some components have limited solubility in the carrier which may result in separation of these components from the composition during storage or use. Esters and natural or synthetic fatty alcohols may be applied to overcome this.

Anti-oxidants

The composition according to the invention may also contain one or more antioxidants for improving the storage life of the compositions. Suitable aromatic amine antioxidants include phenothiazine, iminodibenzyl, diphenylamine and phenyl-α-naphtylamine. Particularly suited are the alkylated aromatic amines. When an antioxidant is present in the composition, the anti-oxidant preferably ranges up to about 0.5% of the total weight of the composition. More preferably the antioxidant is present in an amount of about 0.1 to 0.3%.

Finally it is brought to the fore that percentage of the carrier, present in the composition according to the invention may range between wide limits like 65–95% calculated on the total weight of the composition. Concerning the other components of the composition according to the invention it is remarked that the mutual percentages may also range between wide limits. For instance the percentage of:

the corrosion inhibitor is 0.1–15%, the percentage of the co-corrosion-inhibitor is 4.9–20%, the percentage of the water-repellant is 0–5%, the percentage of the synthetic ester is 0–20%, preferably 5–15%, and the percentage of the $C_{6-18}$ alcohol is 0–15%, preferably 4–11% calculated on the total weight of the composition.

B. THE FIGURES

The invention will be elucidated by means of the following two figures.

C. APPLICATION OF THE COMPOSITION ON STEEL CORD AND THE MEASUREMENT OF THE RELEVANT PROPERTIES

A steel cord according to the first aspect of the invention is manufactured as follows.

Figure 1:
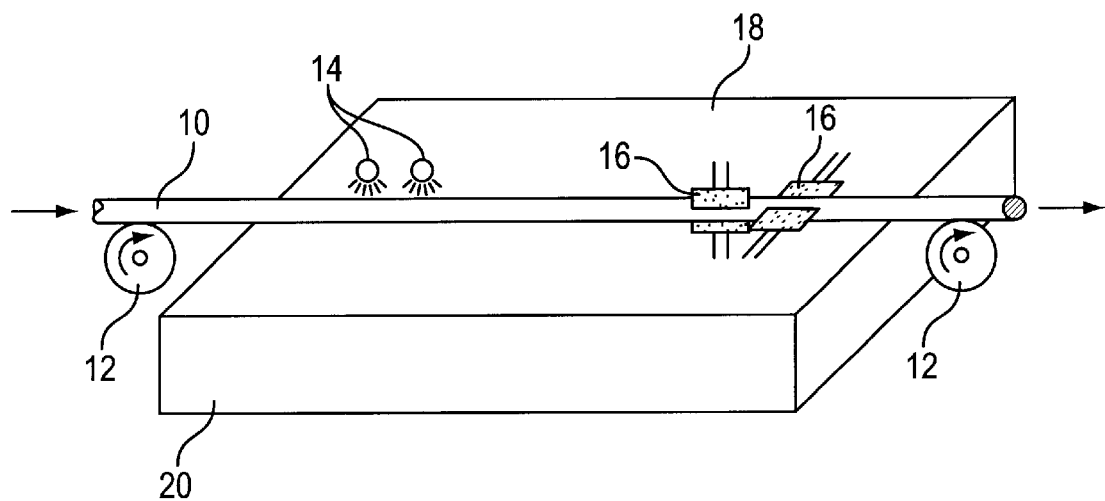
FIG. 1 illustrates a schematic view of the method according to which the corrosion inhibiting composition according to the invention is applied on a steel filament.

Starting from the marketed rod wire, the wire is drawn in several phases until an intermediate diameter is reached. After reaching the intermediate diameter the wire is electrolytically coated with copper and subsequently with zinc, after which a thermodiffusion occurs resulting in a brass coating around the wire. Typically the brass coating has a copper content between 60 and 70% by weight. The wire, having the intermediate diameter is normally completely coated with the brass coating layer. Then the wire having the intermediate diameter is drawn to a smaller final diameter, normally by means of wet-drawing machines. During the wet-drawing the brass coating layer becomes successively porous: the coating layer becomes thinner and thinner and shows local spots where the steel comes to the surface. The porosity may be expressed in a quantitative way as the percentage of iron coming to the surface next to the brass coating layer, and can be determined according to Notter I. M., Gabe D. R. and Warwick M. E.,. "Polarization resistance methods for measurement of the porosity of tin coatings on steel", Trans. IMF 1986, 64, 105–109, and according to Notter I. M. and Gabe D. R., "Porosity of electrodeposited coatings: is cause, nature, effect and management", Corr. Rev. 10, 1992 3/4, 217–280. Porosity values of hard drawn steel cords may vary between 2 and 25%, for instance between 3 and 20%. Subsequently the wire, having its final diameter, is covered with the corrosion inhibiting composition according to the invention, as illustrated in FIG. 1. Wire 10 follows a straight path over guiding wheels 12. From one or more tubes 14 which are provided with holes the corrosion inhibiting composition is dripped on the wire. Somewhat further, downstream, the excess of corrosion inhibiting composition is removed by means of for instance a felt material 16, which is pressed at several sides against wire 10 by means of rods 18. The felt material 16 may be saturated with the corrosion inhibiting composition. After the wiping action by the felts the wire can be dried in a furnace. Recuperation of the corrosion inhibiting composition which drips from the wire 10 or from the felt material 16 may occur by using a recuperation bath 20. Then several wires are twined to a steel cord. Finally the steel cords is wound on a coil for storage and transportation purposes. The covering with the corrosion inhibiting composition according to the invention may also be done after having twisted the wires to a steel cord.

The inventors have discovered that 1 kg steel cord preferably has between 0.1 and 10 g of corrosion inhibiting composition. The thickness of the corrosion inhibiting composition on the steel cord preferably varies between 5 $\mu$m and 100 $\mu$m, preferably between 10 $\mu$m and 50 $\mu$m.

The corrosion behaviour of steel cord covered with a corrosion inhibiting composition according to the invention is simulated and determined according to the standard procedure: "Corrosion tests and standards: application and interpretation, ASTM MNL 20, pp. 86–88, ASTM G3-89, ASTM G5-82, ASTM G 15-85a and ASTM STP 727 and by means of the so-called gel test, which has been described in EP-A-0 290 086. In this gel test the steel cord is used as a working electrode in an electrochemical cell comprising reference electrodes. An electric current having changing frequencies is applied to the electrochemical cell and per applied frequency the amplitude and phase of the resulting electric voltage is determined.

Figure 2:
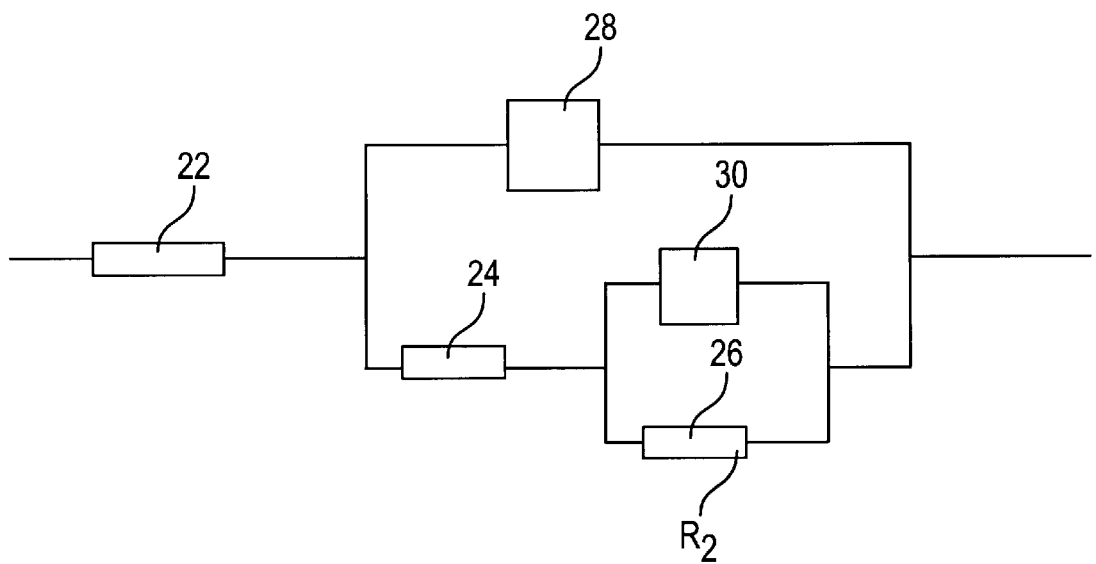
FIG. 2 illustrates an electric equivalent circuit, applied for corrosion studies.

For analysis of the dynamic corrosion behaviour the electric equivalent circuit according to FIG. 2 is used. In this figure the elements 22, 24 and 26 represent electric resistors (impedance values having only a real part) and elements 28 and 30 represent elements having a constant phase.

The major value in this equivalent circuit is the value of the electric resistor 26 (R2). The higher the value of this resistor, the longer the corrosion resistance of the tested steel cord. Another parameter, next to the resistance value of electric resistor 26, which is used for the determination of the corrosion resistance, is the so-called "inhibition rating"

as defined in "Compendium of Chemical Terminology", IUPAC Recommendations, Blackwell Scientific Publications, 1987, p. 198:

$$I=(V_0-V)/V_0$$

wherein

I represents the corrosion inhibition rating (in percent);

$V_0$ represents the corrosion rate of a non-treated steel cord with $V_0=1/R_2$ V represents the corrosion rate of a treated steel cord with $V=1/R_2$ $R_2$ is the resistance value of electric resistor 26.

The other important property i.e. the adherence between the rubber and a steel cord treated according to the invention is determined as follows. A non-treated steel cord, together with a treated steel cord is embedded in an industrial rubber composition which is subsequently vulcanized. Both steel cords are pulled out from the vulcanized rubber and the forces necessary therefore are measured and compared resulting in the "adherence loss rating".

EXAMPLE

A steel cord is manufactured and treated in the above-mentioned way with a corrosion inhibiting composition according to the invention composed of the following components:

| | |
|---|---|
| Mineral seal oil, as carrier | 78.4% |
| Naphthenic Acid 13, Barium soap, as co-corrosion inhibitor | 9.8% |
| Butylglycol, as water repellent | 1.3% |
| Barium suphonate, as corrosion inhibitor | 10.5% |
| Total | 100% |

The results of the corrosion and adhesion tests can be summarized as follows:

Corrosion inhibiting rating, if compared with non-treated reference=+46%

Adherence gain (+) or loss (−) rating in some rubbers, if compared with non-treated reference=−1% to +3.2%.

An example of an adhesion rubber composition where the adherence loss was considerably reduced according to the invention, is as follows:

| | | |
|---|---|---|
| natural rubber | 60 | phr |
| SBR 1502 | 40 | |
| carbon black N300 | 65 | |
| silica Ultrasil VN3 | 15 | |
| processing oil Dutrex 729 HP | 5 | |
| zinc oxide | 15 | |
| stearic acid | 0.5 | phr |
| Santoflex 13 6-PPD | 2 | |
| DPPD TMQ | 1 | |
| Co-B complex | 1.2 | |
| resorcinol | 5 | |
| methylene donor | 2.5 | |
| tackyfying resin | 4 | |
| Curing system | | |
| sulphur | 3.5 | phr |
| DCBS | 1.2 | |

The reason why the above-mentioned corrosion inhibiting composition results, in addition to an improved resistance against corrosion, in a maintenance of the adhesion level, may be explained as follows. Next to the sulphonate of the group IIA, there is some sulphonic acid present. This is either due to a balance of some sulphonic acid after formation of the sulphonate or due to hydrolysis. These small amounts of sulphonic acid perform an etching or pickling operation on the brass surface of the steel cord and etch the Zn-part away so that the surface of the steel cord has an increased amount of copper. This increased amount of copper results, in the best case, in a slightly improved adhesion and, in the worst case, in a very limited adhesion loss.

What is claimed is:

1. An elongated steel object partly or fully covered with a coating layer having an electrode potential exceeding the electrode potential of said steel object or having a rate of corrosion which is lower than the rate of corrosion of steel, treated with a corrosion inhibiting and adhesion retention composition, wherein said composition comprises:

A) an oily or waxy carrier as a carrier of active components, and

B) active components comprising:

B1) a corrosion-inhibitor in the form of a sulphonate of the group IIA;

B2) a co-corrosion-inhibitor, selected from the group consisting of:

(a) one or more of fatty acids, having 6–24 carbon atoms, aromatic acids and naphthenic acids, which acids have the free acid form or the salt form (b) one or more of imidazoline derivatives having a $C_{6-24}$ alkyl moiety; and (c) one or more of $C_{6-24}$ alkylsuccinic anhydride compounds; and (d) mixtures of one or more of the compounds defined under (a), (b) and (c), or mixtures of multiple forms of the compounds defined under (a), (b) and (c); and C) optionally a compound selected from the group consisting of:

C1) a water repellent;

C2) a synthetic ester derived from a $C_{1-10}$ alcohol with 1–12 hydroxyl groups and $C_{6-24}$ fatty acids; and C3) a $C_{6-18}$ alcohol; and C4) a mixture of one or more of compounds defined under C1), C2) and C3), or mixtures of multiple forms of the compounds defined under C1), C2) and C3);

wherein said elongated steel object is a hard drawn steel wire; and wherein said composition has a thickness ranging from 5 $\mu$m to 100 $\mu$m.

2. An elongated steel object according to claim 1, wherein the carrier in said composition is selected from oils and waxes of one or more of mineral, animal, vegetable and synthetic origin.

3. An elongated steel object according to claim 2, wherein the carrier in said composition is of synthetic origin.

4. An elongated steel object according to claim 3, wherein the carrier in said composition is mineral seal oil.

5. An elongated steel object according to claim 1, wherein the corrosion-inhibitor comprises bariumsulphonate.

6. An elongated steel object according to claim 1, wherein the corrosion-inhibitor comprises calciumsulphonate.

7. An elongated steel object according to claim 1, wherein in said composition the fatty acids comprise at least one of synthetic and natural fatty acids having from 6 to 24 carbon atoms as well as mixtures thereof.

8. An elongated steel object according to claim 7, wherein in said composition the fatty acids comprise at least one of a salt form selected from the group consisting of alkali metal, alkaline earth metal, ammonium and amine salts.

9. An elongated steel object according to claim 1, wherein in said composition the aromatic acids comprise benzoic acid substituted by one or more $C_{6-24}$ alkyl groups.

10. An elongated steel object according to claim 9, wherein in said composition the aromatic acids comprise at least one of a salt form selected from the group consisting of alkali metal, alkaline earth metal, ammonium and amine salts.

11. An elongated steel object according to claim 1, wherein in said composition the naphthenic acids comprise at least one of a salt form selected from the group consisting of alkali metal, alkaline earth metal, ammonium and amine salts.

12. An elongated steel object according to claim 11, wherein in said composition the naphthenic acid salt comprises a naphthenic-13-barium salt.

13. An elongated steel object according to claim 1, wherein in said composition the imidazoline derivatives comprise imidazoline phosphate esters having a $C_{6-24}$ alkyl group.

14. An elongated steel object according to claim 1, wherein in said composition the $C_{6-24}$ alkyl succinic anhydride is selected from the group consisting of undecyl, dodecyl and tridecyl succinic anhydride or mixtures thereof.

15. An elongated steel object according to claim 1, wherein in said composition the water-repellent comprises at least one of $C_{1-5}$, alcohols and $C_{1-5}$ alkylglycols.

16. An elongated steel object according to claim 15, wherein in said composition the water-repellent comprises butyldiethyleneglycol.

17. An elongated steel object according to claim 1, wherein the synthetic ester in said composition comprises an ester of neopentyl glycol and cocos fatty acids.

18. An elongated steel object according to claim 1, wherein the synthetic ester in said composition comprises an ester of neopentyl glycol and $C_{8-18}$ technical fatty acids.

19. An elongated steel object according to claim 1, wherein the $C_{8-16}$ alcohol in said composition comprises a $C_{12-13}$ technical alcohol.

20. An elongated steel object according to claim 1, wherein in said composition the percentage of the carrier is 65–95%, calculated on the total weight of the composition.

21. An elongated steel object according to claim 20, wherein the percentage of the corrosion-inhibitor in said composition is 0.1–15%, the percentage of the co-corrosion inhibitor in said composition is 4.9–20%, the percentage of the synthetic ester is 0–20%, the percentage of the C6–18 alcohol is 0–15%, and the percentage of the water-repellent in said composition is 0–5%, calculated on the total weight of the composition.

22. An elongated steel object according to claim 1, wherein the coating layer is a metallic layer.

23. An elongated steel object according to claim 22, wherein the coating layer is brass.

24. An elongated steel object according to claim 1, wherein the elongated steel object is partly covered with the coating layer.

25. A steel cord comprising two or more steel wires comprising the elongated steel object according to claim 1.

26. An elongated steel object according to claim 1, wherein said composition has a weight ranging from 0.1 g to 10 g per kg elongated steel object.

27. An elongated steel object according to claim 1, further comprising a rubber coating.

28. An elongated steel object according to claim 27, wherein the coating composition is a liquid.

29. An elongated steel object partly or fully covered with a coating layer having an electrode potential exceeding the electrode potential of said steel object or having a rate of corrosion which is lower than the rate of corrosion of steel, treated with a corrosion inhibiting and adhesion retention composition, wherein said composition comprises:

A) an oily or waxy carrier as a carrier of active components, and

B) active components comprising:
  B1) a corrosion-inhibitor in the form of a sulphonate of the group IIA;
  B2) a co-corrosion-inhibitor, selected from the group consisting of:
    (a) one or more of fatty acids, having 6–24 carbon atoms, aromatic acids and naphthenic acids, which acids have the free acid form or the salt form;
    (b) one or more of imidazoline derivatives having a $C_{6-24}$ alkyl moiety; and
    (c) one or more of $C_{6-24}$ alkylsuccinic anhydride compounds; and
    (d) mixtures of one or more of the compounds defined under (a), (b) and (c), or mixtures of multiple forms of the compounds defined under (a), (b) and (c); and C) optionally a compound selected from the group consisting of:
  C1) a water repellent;
  C2) a synthetic ester derived from a $C_{1-10}$ alcohol with 1–12 hydroxyl groups and $C_{6-24}$ fatty acids; and
  C3) a $C_{6-18}$ alcohol; and
  C4) a mixture of one or more of compounds defined under C1), C2) and C3), or mixtures of multiple forms of the compounds defined under C1), C2) and C3);

wherein said elongated steel object is a hard drawn steel wire;

wherein the elongated steel object is partly covered with the coating layer; and wherein said coating layer has a porosity ranging from 2% to 25%.

30. An elongated steel object partly covered with a coating layer having an electrode potential exceeding the electrode potential of said steel object or having a rate of corrosion which is lower than the rate of corrosion of steel, treated with a corrosion inhibiting and adhesion retention composition, wherein said composition comprises:

A) an oily or waxy carrier as a carrier of active components, and

B) active components comprising:
  B1) a corrosion-inhibitor in the form of a sulphonate of the group IIA;
  B2) a co-corrosion-inhibitor, selected from the group consisting of:
    (a) one or more of fatty acids, having 6–24 carbon atoms, aromatic acids and naphthenic acids, which acids have the free acid form or the salt form
    (b) one or more of imidazoline derivatives having a $C_{6-24}$ alkyl moiety; and
    (c) one or more of $C_{6-24}$ alkylsuccinic anhydride compounds; and
    (d) mixtures of one or more of the compounds defined under (a), (b) and (c), or mixtures of multiple forms of the compounds defined under (a), (b) and (c); and C) optionally a compound selected from the group consisting of:
  C1) a water repellent;

C2) a synthetic ester derived from a $C_{1-10}$ alcohol with 1–12 hydroxyl groups and $C_{6-24}$ fatty acids; and C3) a $C_{6-18}$ alcohol; and C4) a mixture of one or more of compounds defined under C1), C2) and C3), or mixtures of multiple forms of the compounds defined under C1), C2) and C3);

wherein said elongated steel object is a hard drawn steel wire;

wherein the elongated steel object is partly covered with the coating layer; and wherein 2–25% of the elongated steel object is not covered by the coating layer.

* * * * *